United States Patent [19]

Kratochvil

[11] 4,119,732

[45] Oct. 10, 1978

[54] METHOD FOR RAPIDLY PRODUCING CHEESE

[75] Inventor: John F. Kratochvil, Oak Brook, Ill.

[73] Assignee: Swift & Company, Chicago, Ill.

[21] Appl. No.: 697,712

[22] Filed: Jun. 21, 1976

[51] Int. Cl.$^2$ ............................................. A23C 19/00
[52] U.S. Cl. ........................................ 426/36; 426/35; 426/38; 426/42; 426/43; 426/61
[58] Field of Search ........................ 426/36, 38, 40, 61; 195/59, 96

[56] References Cited

U.S. PATENT DOCUMENTS

| | | | |
|---|---|---|---|
| 2,796,351 | 6/1957 | Walter et al. | 426/36 |
| 3,650,768 | 3/1972 | Roberts | 426/36 X |
| 3,852,158 | 12/1974 | Anderson et al. | 426/36 X |

OTHER PUBLICATIONS

Kosikowski, F., Cheese and Fermented Milk Foods, Published by the Author, Cornell University, Ithaca, N.Y. 1966 pp. 14–16).
Dahlberg et al., The Development of Flavor In American Cheddar Cheese made from Pasteurized Milk with *Streptococcus Faecalis* Starter, J. Da. Sci., vol. 31, 1948 (pp. 275–284).
Davis, J. G., Cheese, vol. I. American Elselier Publishing Co., N.Y. 1965 (pp. 179–181).

*Primary Examiner*—David M. Naff
*Attorney, Agent, or Firm*—Charles E. Bouton

[57] ABSTRACT

American cheese is made according to regular processing sequences with the addition of specific pairs of strains of *Lactobacillus plantarum* and *Streptococcus durans* bacteria and a combination of kid, calf, and lamb pre-gastric lipases and cured at 60°–68° F. whereby uniform and fully aged flavor is developed within about 10 weeks and less.

7 Claims, No Drawings

METHOD FOR RAPIDLY PRODUCTING CHEESE

The present invention relates generally to an improved method for making cheese and more particularly relates to a method for rapidly developing uniform, sharp and full flavor in ripened cheeses, such as American Cheese, during the curing period.

American Cheese is generally understood to be a term which includes a group of cheeses such as Cheddar Cheese, Colby Cheese, Monterey and Jack Cheeses and stirred curd and washed curd cheeses. Cheddar cheese is so named because of a step in the manufacturing process wherein the drained cheese curd is cheddared or matted. While the present invention is sometimes described with particular reference to Cheddar cheese it should be understood that the invention is also applicable to the production of other cheese having similar curd characteristics, texture and flavor, such as those identified hereinbefore In accordance with known methods for making American cheeses and similar types of cheese, milk, either pasteurized or non-pasteurized, is usually adjusted to a temperature from 86° to 88° F. and is run into a cheese vat. Color may be added to the milk. A starter of *Streptococcus lactis* or similar microorganism is added to the mild and is stirred as the milk ripens by the development of acidity through bacterial action-usually the production of lactic acid. Rennet is then mixed thoroughly into the ripened milk and stirring is stopped. (A number of alternate proteolytic enzymes are known to the art and may be used instead of rennet.) The milk is permitted to sit so as to form a coagulum of curd.

When the curd is sufficiently firm, it is cut into cubes. It is then stirred continuously as the whey is expelled. Also the curd is usually heated in the whey over a period of about ½ hour to a temperature of about 101° F.

The whey is drained from the curd, and the curd is then packed several inches deep. When the curd is firm enough to be turned without breaking, it is cheddared. That is it is cut into slabs about 7 inches wide and turned frequently. Thereafter the slabs are piled into layers. After cheddaring the curd is milled and stirred and salt is added. This causes additional whey to be expelled.

After salting and draining, the curd is placed in cloth lined metal hoops or the like and pressed for about ½ hour to form a cheese. The surface of the cheese may be dressed with a cloth and the cheese is pressed again for a longer period after which it is removed from the hoop and wrapped in a suitable material for curing and aging. Frequently the cheese is cured anaerobically in plastic wrappers or sealed containers, and during the curing the cheese is usually kept cool at about 45° F.

Curing usually requires at least sixty days to provide what is known as green or low flavored cheese. Lengthier curing periods of from 3 to 6 months, provide mildly flavored cheddar cheese. Aged cheddar cheese is produced by curing cheese for 6 to 12 months and even longer.

The lengthy time required for aging and curing results in very substantial space requirements to produce and store large quantities of cheese. Thus it would be of great economic advantage to be able to shorten the aging time as less storage space would be required for the same rate of production. Moreover large quantities of American type cheeses are used in producing "processed cheese" but the demand for such cheese varies from time to time and must be forecast well in advance. If the curing time for American cheese could be shortened the forecasting of processed cheese requirements could be made more readily on a shorter lead time basis.

Thus it has long been a goal in the cheese industry to reduce the curing time required to develop flavor in ripened cheeses. In this connection attempts have been made to effect curing at substantially elevated temperatures (above usual curing temperatures of about 45° F.) so as to increase the action of bacteria during the curing period and to more quickly develop the ripened flavor. However, the presence of undesirable microorganisms can be accentuated with currently known rapid curing techniques and bad cheese may result. In an effort to reduce that problem, and for other reasons, it has been proposed to produce cheese cured at higher temperatures from pasteurized or sterile milk. It is well known that the heat treatment of milk to pasteurize or sterilize the same destroys desirable microorganisms and enzymes as well as undesirable microorganisms and enzymes that may naturally occur in milk. Consequently there have been many attempts to utilize specific microorganisms which are thought to contribute desirable flavor characteristics, so as to produce improved flavor in cheese made from heat treated milk. Most of these attempts have failed to rapidly produce cheese of historically accepted flavor. However, even when a desirable flavor is produced by the addition of microorganisms and enzymes the period of time required to cure the cheese has still been relatively lengthy.

Accordingly, the present invention is directed to an improved method for reducing the period of time required to cure the cheese whether the cheese is made from raw, heat treated, pasteurized, or sterilized milk.

Another object of the present invention is to provide an improved method for rapidly producing ripened cheese of fully developed traditional flavor wherein the cheese is made from milk containing limited amounts of naturally occurring microorganisms and a particularly selected bacteria combination is added thereto.

It is another object of the present invention to provide an improved method for making ripened cheese of uniformly well developed flavor in a reduced period of time.

Still another object of the present invention is to provide a method for making such cheese wherein the flavor of the cheese is developed more rapidly during curing.

Yet another object of the present invention is to provide an improved combination of acid producing bacteria which, when used in cheese making, enable a rapid development of uniform aged-like flavor in cheese.

Briefly stated the present invention involves essentially the same sequence of steps normally used for production of American type cheeses but wherein flavor development is obtained more rapidly by utilizing specific pairs of acid producing bacteria selected from the classes *Lactobacillus plantarum* and *Streptococcus durans*, and kid, calf, or lamb pre-gastric lipase (either singly or in combination) in addition to the usual starter culture and rennet, and the cheese is cured for a period of from 4 to 10 weeks at a moderately higher (than usual) temperature of 60°–68° F.

These and other objects of the present invention will become clearer upon reading the following detailed description of a preferred embodiment of the invention.

According to the present invention a preferred method for producing cheddar cheese is as follows. Raw milk is collected and analyzed for total bacteria content. Best results are obtained if this milk contains less than 3 million bacteria per milliliter and preferably less than 1 million per milliliter. If the bacteria count exceeds 3 million per milliliter the milk should be subjected to pasteurization or sub-pasteurization conditions (elevated temperature for brief periods of time) sufficient to destroy pathogenic organisms and to reduce the total count at least to within this level.

The milk is placed in a vat and adjusted to a temperature of about 87° F. At this point acid producing bacteria are added. Preferably the bacteria are a combination of a regular commercially available starter culture for cheese, such as strains of *Streptococcus cremoris* and *Streptococcus lactis* (in normal quantity), and a single pair of specifically selected strains of each of *Lactobacillus plantarum* and *Streptococcus durans*. Certain strains of the latter two bacteria have been found to be particularly advantageous to the rapid development of desirable cheese flavor. Not all strains of *L. plantarum* and *S. durans* are acceptable; and the proper manner of identification and selection will be described hereinafter. The starter culture is introduced into the milk at a level of approximately two million cells per milliliter of milk; and the strains of *L. plantarum* and *S. durans* are added in lesser quantities with the preferred number of cells of *L. plantarum* being 2 to 5 times as great as the number of cells of *S. durans*. Best results are obtained where the *L. plantarum* amounts to between 5% and 15%, and the *S. durans* amounts to between 2% and 8% of the quantity of the starter bacteria.

Considerably lower levels of the selected *L. plantarum* and *S. durans* bacteria are functional, as they will grow while the cheese is aging and thereby develop the desired aged cheese flavor characteristics. Indeed it has been found that the selected strains of *L. plantarum* and *S. durans* may actually be added to the cheese at any stage prior to aging and curing and a desirable flavor will be developed in the cheese. However the preferred higher levels of bacteria added with a starter culture are of greater advantage, particularly where the raw milk is not heat treated, as the selected bacteria compete with and inhibit growth of less desirable microorganisms.

After the bacteria have been added to the milk it is allowed to ripen for about 1 to 2 hours until the proper acidity (an increase of about 0.01% to 0.02% acidity) has been developed. The milk is kept warm (about 87° F.) and gently agitated during this period. Thereafter rennet and/or other suitable proteolytic enzymes are added to cause the milk to coagulate. Generally about two to three ounces of single strength rennet are used per 1,000 lbs. of milk, and the rennet is diluted with about 40 times its weight of water. Preferably one or more special lipases are also dissolved in the rennet water. Suitable lipases are described in U.S. Pat. No. 2,531,329. These are essentially commercially available pre-gastric lipases obtained from the throat tissue of kids, calves and lambs. Lipases of plant or microbial origin that have similar specificity may be used in place of the pre-gastric lipases. The proteolytic enzyme acts on the casein protein to promote coagulation of the curd; and the lipase acts on the fat to develop flavor early during curing which would otherwise develop slowly during a long curing period. Although any one or a combination of these commercially available lipases can be used to increase the lipolytic flavor of American cheeses, it is preferred to use a combination of about 1 gram of the the kid lipase with 0.5 gram of the calf lipase per 1,000 pounds of milk.

The lipases mainly catalyze the hydrolysis of butterfat to free fatty acids and diglicerides, with lesser amounts of monoglicerides being formed. Agitation of the milk is stopped when the enzymes are added and within about 20–30 minutes thereafter the milk will be substantially completely coagulated and firm.

At this point various mechanical steps are undertaken to produce the particular form of cheese that is wanted. For cheddar cheese the coagulum, or curd, is cut with wire harps into ¼ to ⅜ inch cubes. It is then continuously stirred and usually heated to about 101° F. so as to expel whey. The whey is then drained from the curd and the latter is firmed and cheddared until a whey acidity of about 0.60% is reached (or about 0.50% where the milk was heat treated). The curd is then milled and salted with about 2.5 lbs. of salt per 1,000 lbs. of original milk. The salted curd is either pressed in 40 lb. blocks to expel additional whey or it is placed in 500 lb. barrels and drained overnight. Other cheese sizes may also be used.

After the final whey has drained, barrels of cheese are tightly lidded and blocks of cheese are sealed in plastic film with a low water vapor and oxygen transmission rate which creates an anaerobic environment that is best for developing cheese flavor. This environment will hinder and inhibit the growth of undesirable organisms such as molds and mites and it will prevent moisture loss and rind formation. However, activity of the selected *L. plantarum* and *S. durans* will continue and cheese with fine aged flavor will be obtained rapidly. It has been found that the cheese prepared as herein described will develop a fully aged flavor, equivalent to that obtained by traditional methods of preparation and aging for 9–12 months, within just 4–6 weeks if it is maintained at about 68° F. However, the flavor thereby obtained will be retained at its peak for only a relatively brief period and it is difficult to determine the optimum termination point for aging. Also a slightly acid taste sometimes develops at this temperature. Accordingly, it is preferred to age the cheese at a temperature of about 60° F. which will result in the fully aged flavor being developed at 9 to 10 weeks. (By comparison traditionally prepared cheddar cheese aged at about 45° F. will be very bland in flavor at the end of 10 weeks.)

When the aged flavor has fully developed, the cheese is handled in the normal manner and stored at refrigerated temperature to prevent deterioration of flavor. It may be subdivided into consumer size units, rewrapped, and distributed for consumption. It may also be used in the production of processed cheese.

The proper strains of *L. plantarum* and *S. durans* for practicing this invention may be identified by their ability to meet certain requirements for coagulating milk and whether this function is stimulated by "Bacto Dehydrated APT Broth" (believed to be a trademark of the Difo Laboratories). Bacto products are manufactured by Difco Laboratories of Detroit, Michigan. Bacto Dehydrated APT Broth consists of a blend of the following ratio of dry ingredients: 7.5g of Bacto Yeast Extract, 12.5g of Bacto Tryptone, 10.0g of Glucose, 5.0g of tri sodium citrate $\times$ 11 $H_2O$, 0.0001g of thiamine hydrochloride, 5.0g of NaCl, 5.0g of $K_2HPO_4$, 0.14g of $MnCl_2 \times 4H_2O$, 0.8g of Mg $SO_4 \times 7H_2O$, 0.04g of $FeSO_4 \times 7H_2O$, and 0.2g of polyoxyethylene sorbitan monooleate (tween 80, manufactured by Atlas Chemical Industries, Inc. of Wilmington, Delaware.) (Bacto Yeast Extract is a dehydrated water extract of autolyzed fresh yeast. Bacto tryptone is a pancreatic digest of casein.) Only those strains of L. plantarum which will coagulate reconstituted skim milk within 24 hours when held at 100° F. using a 1% innoculum of culture media, may be used. Better strains, for the purpose of this invention, of *L. plantarum* will also be stimulated to more rapidly coagulate reconstituted skim milk within 16 hours under the same conditions, where APT Broth is present. Suitable strains of *S. durans* are those capable of coagulating reconstituted skim milk, when introduced at a level of about 1%, within 20 hours at 100° F. Better strains of *S. durans* will coagulate this growth medium within 16–18 hours under the same conditions. Stimulation by APT Broth is not significant to the choice of *S. durans*. In addition to the growth stimulating effect of APT Broth when used with skim milk, the strains of *L. plantarum* and *S. durans* are cultured on a media consisting of 46.2g of APT Broth dissolved in 1 liter of water which has been sterilized and cooled.

A suitable technique for testing these bacteria is to first culture any single strain on a standard culture media, such as that described using "APT Broth" produced by the Difco Corporation, at about 100° F. until turbidity occurs, indicating that a significant cell concentration has been developed. A sample of the media is then used to inoculate a reconstituted skim milk solution prepared by mixing 11 grams of dry skim milk powder in 89 grams of water and steaming this solution for one hour. The skim milk solution is cooled to 100° F. and 1 gram samples of *L. plantarum* culture media and 1 gram sampls of *S. durans* culture media are used to inoculate 100 gram quantities of solution, respectively. The *L. plantarum* strains are tested again, for coagulation within 16 hours, under the same conditions except that the milk solution contains 1 gram dehydrated APT Broth in place of 1 gram of water.

Best results are obtained, once a number of suitable strains of each of *L. plantarum* and *S. durans* have been selected and cultivated, where each strain is also separately tested for its flavor effect on American cheese and the superior strains are then further tested in pairs of single strains of *L. plantarum* combined with single strains of *S. durans*. Again superior pairings, flavorwise, will become evident. Thereafter when used to produce successive batches of cheese in the same equipment it is preferred to alternate several such superior pairings of *L. plantarum* and *S. durans* so as to reduce the likelihood of a build up of bacteriophage against any bacterium.

Specific examples of superior pairings, with the source of specific strains being identified, are as follows:
 a. Miles Laboratories, Inc. Lactobacillus plantarum No. 442
 Iowa State University *Streptococcus durans* No. 15-20
 b. American Type Culture Collection (ATCO) *Lactobacillus plantarum* No. 8292
 Miles Laboratories, Inc. *Streptococcus durans* No. DM11-2
 c. New Zealand Dairy Research Institute *Lactobacillus plantarum* No. 21.1
 Iowa State University Streptococcus durans No. 9-20
 d. New York State Agricultural Experiment Station, Geneva, N.Y. *Lactobacillus plantarum* No. 246
 Iowa State University *Streptococcus durans* No. SF/0

These and similar pairs of selected strains of *L. plantarum* and *S. durans* may be suitably cultivated separately in quantity and combined in the ratios previously described in amounts appropriate to add directly to batches of milk for cheese making. These bacteria may be conveniently dried or frozen, in viable state, by techniques known to the microorganism culturing art and packaged for storage in cans and other containers and thereby inventoried against future needs. Some of the above strains of *L. plantarum* can be paired with other strains of *S. durans* and used to produce good flavored cheese.

Examples of cheese production according to the present invention are as follows:

EXAMPLE I

CHEDDAR CHEESE

Thirteen thousand pounds of milk heated at 153° F. for 16 seconds was cooled to 87° F. and pumped into a cheese vat. To the milk was added 1%, by weight, of ripened commercial starter culture, (Chr. Hansen's-Milwaukee, Wisc.-No.53), one liter of culture of Lactobacillus plantarum No. 442 (per above), and 0.5 liter of culture of *Streptococcus durans* No. 9-20. Approximately $2 \times 10^5$ cells of the *L. plantarum* strain and $4 \times 10^4$ cells of the *S. durans* strain were present per milliliter of milk at the time of inoculation. After a ripening period of about 1 hour a water solution containing 33 ounces of single strength rennet, 13.0 grams of kid lipase, and 6.5 grams of calf lipase was mixed into the milk. The milk coagulated in a normal manner in about 25 minutes and was then cut into cubes by wire harps. Thereafter processing followed the full sequence for cheddar cheese. The acidity just before milling was 0.47%. The curd was then salted with 33 lbs. of salt and pressed into 40 pound blocks. Approximately 1300 lbs. of cheese were obtained. Thereafter the cheese contained 38.7% moisture, 33.0% fat, and 1.4% salt. This product was aged at 60° F. for 10 weeks and upon testing was found to have an intense aged cheddar cheese flavor.

EXAMPLE II

CHEDDAR CHEESE

Fourteen thousand five hundred pounds of raw milk was pumped into a cheese vat and its temperature was raised to 86° F. One hundred pounds of ripened starter culture (Marschall-Madison, Wisc.-culture M20), 1 liter of culture of Lactobacillus plantarum No. 246, and 0.5 liter of culture of *Streptococcus durans* SF/0 were added to the milk. The vat milk contained about $6 \times 10^5$ cells per milliliter of the *L. plantarum* and about $1.1 \times 10^5$ cells per milliliter of the *S. durans*. The milk was ripened for about 2 hours and then a solution of 14 ounces of 50/50 double strength rennet-pepsin, 14.0 grams of kid lipase, and 7.0 grams of calf lipase was mixed with the milk. After 20 minutes the coagulated milk was cut into cubes and the curd was processed in a manner similar to that normally used to produce cheddar cheese. The milling acidity was 0.56%. After salting with 37.5 lbs. of salt the curd was placed in barrels and drained. 1422 lbs. of cheese were obtained which contained 37.3% moisture and 1.64% salt. The cheese was aged for 9 weeks at 60° F. and found to then possess a strong sharp flavor.

EXAMPLE III

STIRRED CURD CHEESE

Thirty-seven thousand pounds of milk heated at 153° F. for 16 seconds was cooled to 88° F. and added to a cheese vat. Two hundred sixty-five pounds of starter culture (Marschall culture MD) was mixed in the milk along with 2 liters of culture of *L. plantarum* No. 442 and 1 liter of culture of *S. durans*. No. 15-20. The vat milk then contained approximately $3 \times 10^5$ cells per milliliter of *L. plantarum* and $1 \times 10^5$ cells per milliliter of *S. durans*. The milk was ripened for 1 and 20 minutes after which a solution of 50 ounces of double strength rennet-pepsin, 36.0 grams of kid lipase, and 18.0 grams of calf lipase was added to the milk. One half hour later the coagulated milk was cut into cubes which were stirred as the temperature was raised to 101° over a 30 minute period. Next the steam heating for the vat was shut off and stirring was continued until an acidity of 0.23% developed in the whey. Thereupon approximately one half of the whey was removed from the vat and the remainder of the whey with curds was pumped to a drain table. There the whey was drained off and the curds were stirred further until an acidity of 0.50% was reached. Finally the curds were salted with 60 lbs. of salt and placed in barrels. After draining overnight the cheese contained 34.4% moisture and 1.4% salt. 3552 lbs. of cheese were obtained. This cheese was aged for 9 weeks at 60° F. at which time it developed a very pleasing sharp flavor.

Obviously many modifications and variations of the invention as hereinbefore set forth may be made without departing from the spirit and scope thereof, and, therefore, only such limitations should be imposed as are indicated in the appended claims.

I claim:

1. In a process for producing American type cheese of fully developed flavor wherein milk containing between 0-3 million naturally occurring bacteria per milliliter is treated with an acid forming regular cheese starter bacteria culture, coagulated by the subsequent addition of an enzyme, whey is expelled and the resultant curd is cured, the improvement comprising: adding to the milk or curd at a point prior to the curing of the curd an extra pair of bacteria in addition to said regular cheese starter bacteria culture, and adding one or more pregastric lipases prior to or concurrent with the introduction of the milk coagulating enzyme; said extra pair of bacteria comprising at least one strain of *Streptococcus durans*, present at from 2% to 8% of the cell concentration of the starter bacteria and capable of coagulating reconstituted skim milk at 100° F. within 20 hours when added at 1% of this milk, and at least one strain of *Lactobacillus plantarum*, present at from 5% to 15% of the cell concentration of the starter bacteria and in an amount of 2-5 times as great as the *Streptococcus durans*, and capable of coagulating reconstituted skim milk at 100° F. within 24 hours when added at 1% of this milk as well as showing stimulated growth from APT broth by coagulating reconstituted skim milk containing 1% of this substance within 16 hours at 100° F. with a 1% inoculum; and curing the cheese for a period of 4 to 10 weeks at a temperature within the range of 60°-68° F. sufficient to develop a fully aged cheese flavor.

2. The process of claim 1 wherein said selected pair of microorganisms is added to the milk at the time the regular cheese starter culture is added.

3. The process of claim 1 wherein the pregastric lipases are added in solution with the milk coagulating enzyme.

4. The process of claim 1 wherein the pregastric lipases include one or more of kid, calf, and lamb lipases obtained from the throat tissues of such animals.

5. The process of claim 4 wherein the pregastric lipases are about 1 gram of kid lipase and about 0.5 grams of calf lipase per 1000 pounds of milk.

6. The process of claim 1 wherein the cheese is cured for about 9-10 weeks at 60° F.

7. The process of claim 1 when applied to successive batches of cheese, which batches are produced on the same equipment, which process is further improved by the use of different strains of said extra pair of bacteria in successive batches of cheese.

* * * * *

UNITED STATES PATENT AND TRADEMARK OFFICE
CERTIFICATE OF CORRECTION

PATENT NO. : 4,119,732
DATED : October 10, 1978
INVENTOR(S) : John F. Kratochvil It is certified that error appears in the above-identified patent and that said Letters Patent are hereby corrected as shown below:

Column 1, line 27, cancel "mild" and substitute therefor --milk--;

Column 5, line 53, cancel "(ATCO)" and substitute therefor --(ATCC)--;

Column 7, line 5, add --hour-- after "1"

Signed and Sealed this

Twentieth Day of February 1979

[SEAL]

Attest:

RUTH C. MASON
Attesting Officer

DONALD W. BANNER
Commissioner of Patents and Trademarks